UNITED STATES PATENT OFFICE.

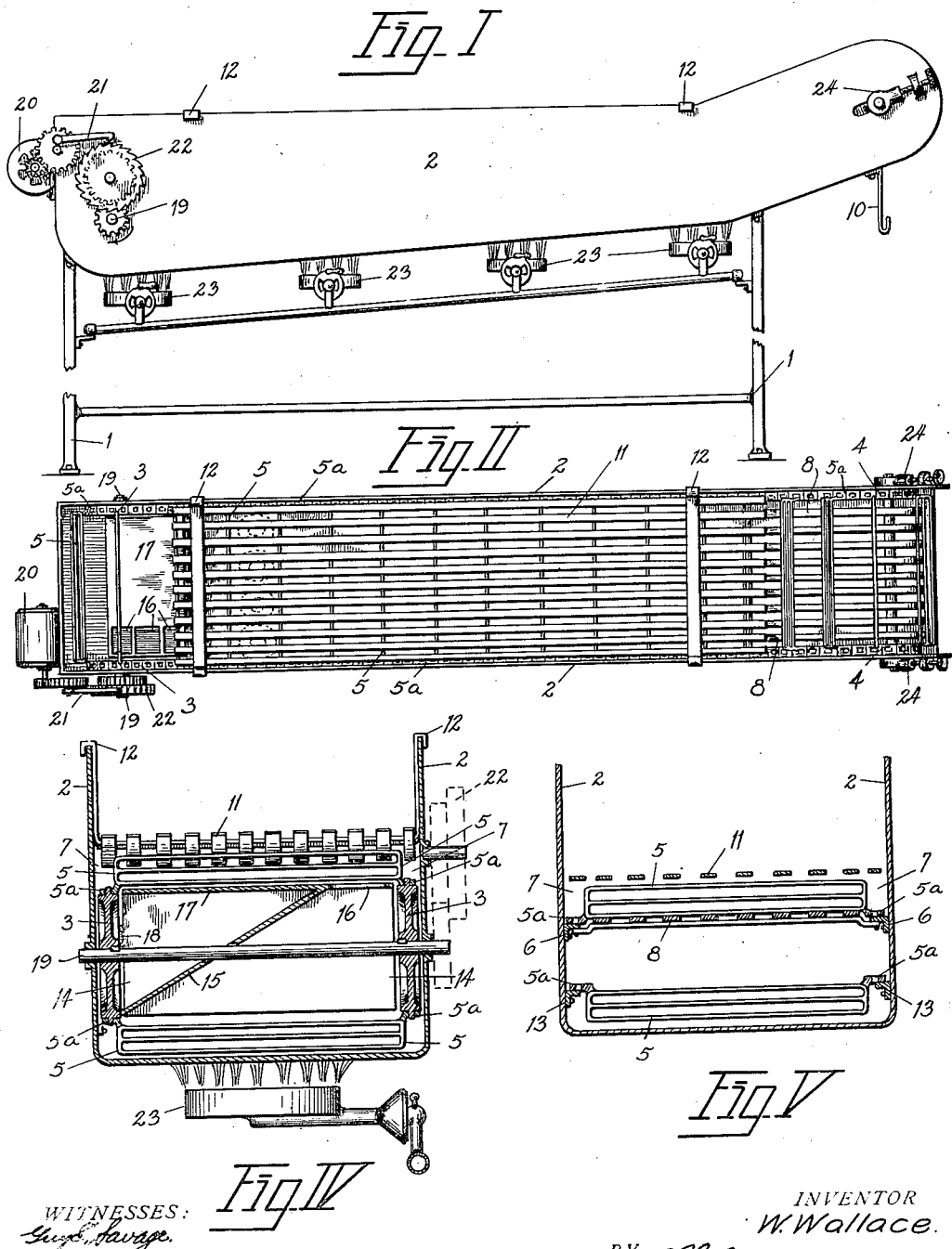

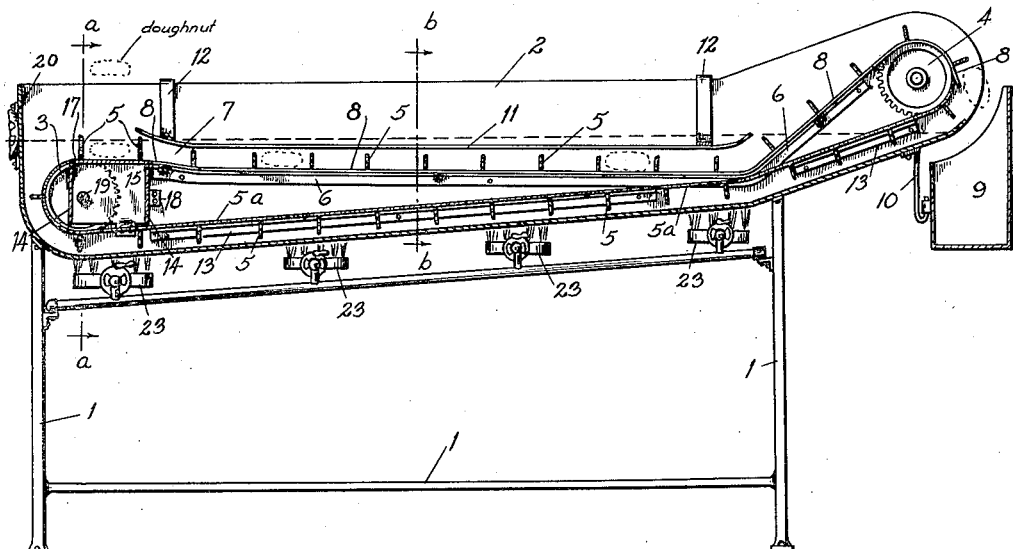
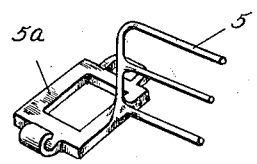
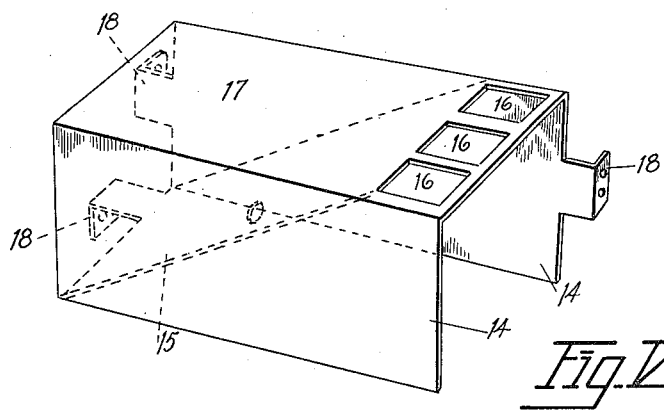

WILLIAM WALLACE, OF PORTLAND, OREGON.

DOUGHNUT-BAKING MACHINE.

1,356,573.  Specification of Letters Patent.  Patented Oct. 26, 1920.

Application filed April 13, 1920. Serial No. 373,666.

*To all whom it may concern:*

Be it known that I, WILLIAM WALLACE, a citizen of the United States, residing at Portland, in the county of Multnomah and State of Oregon, have invented a new and useful Doughnut-Baking Machine, of which the following is a specification.

My invention relates to doughnut baking machines in which the dough rings are received on an endless conveyer, submerged in boiling oil, after a certain time lifted from the oil, dried, and finally deposited in a storage receptacle.

The objects of my invention are: to produce a machine which will insure uniform baking of doughnuts, and perform this work automatically and in a sanitary manner.

I attain these objects with the mechanism illustrated in the accompanying drawings, in which—

Figure I is a side elevation of the entire apparatus.

Fig. II is a plan view of Fig. I.

Fig. III is a longitudinal section through Fig. I.

Fig. IV is a cross section through Fig. III along the line $a$—$a$.

Fig. V is a cross section through Fig. III along the line $b$—$b$.

Fig. VI is a perspective view of the baffle plate construction.

Fig. VII is a detail of the carrier chain.

Similar numerals refer to similar parts throughout the several views.

On a suitable support 1 is placed the elongated kettle 2 partly filled with oil. Immersed in the oil, at the tail end of the kettle are the two sprocket wheels 3; while the two sprocket wheels 4 at the head end are placed above the surface of the oil. Over these sprocket wheels is led an endless conveyer composed of the wire railings 5 which are at opposite ends supported by the links of the carrier chain $5^a$. The wire railings at the tail end project sufficiently above the surface of the oil to form with the sides of the kettle a pen from which a doughnut, when placed therein, cannot escape. The upper run of the conveyer being slack and moving toward the head end, it is a simple matter to guide the carrier chains by properly curved angle irons 6 into a submerged tunnel 7 where the doughnuts are evenly browned all over. The floor 8 of the tunnel, composed of flat bars longitudinally placed and attached to the angle irons 6 proceeds approximately horizontally for a short distance and then inclines upward toward the sprocket wheels 4. Here the doughnuts are drained of excess fat and finally deposited into a receptacle 9 attached at 10 to the head end of the kettle. The roof 11 of the tunnel is of similar construction as the floor, and suspended from the edges of the kettle by the straps 12. The function of the roof, to hold the doughnuts submerged in oil, having been fulfilled at the end of the horizontal run, said roof need not be carried any farther. The taut run of the carrier chains is guided over suitable angle irons 13, to prevent the frail wire railings from being bent at the bottom of the kettle, back to the sprocket wheels at the tail end.

Since my kettle is intended to be wide enough to carry three or more doughnuts in one row, and the doughnuts are preferably deposited by an automatic dough mixing and cutting machine, the last fallen doughnut should be out of the way before the next one drops. For this purpose I create, where the doughnuts are deposited, a circulation of oil by means of a baffle plate construction, illustrated in Fig. VI. As the heated oil rises between the side walls 14 it is led along the inclined plate 15 and emerges through the apertures 16. From there it flows over the top wall 17 toward the other side of the kettle, carrying the doughnut which is dropped over the apertures with it. The main purpose of the top wall 17, however, is to prevent the doughnuts from falling to the bottom of the kettle. The lugs 18 at the end of the baffle plate construction serve to attach the latter to the side walls of the kettle without interfering with carrier chains or sprocket wheels.

To fill one pen with three or more doughnuts requires that the conveyer should stop, while the substitution of the filled pen for an empty one requires forward motion of the conveyer. One way to produce this intermittent motion is shown most clearly in Fig. I where it appears that the shaft 19 on which the sprocket wheels 3 are keyed is connected with the driving motor 20 through a train of gears of which the pawl 21 and the ratchet wheel 22 are the essential elements to make the conveyer movement intermittent. Equivalents may be employed where the exigencies of the case demand it. However care should be taken that my machine is synchronized with such other machine as delivers the dough rings to the conveyer.

The gas burners for heating the oil in the kettle are designated by the numerals 23, and the take-ups at the head end for adjustment of the carrier chains by the numerals 24.

For sanitary reasons the kettle should be provided with a cover, and a funnel from the cover to the outside air, but the construction of these accessories is so well known that no particular description of details is necessary.

Having thus described my invention, it will be seen that my objects have been accomplished and, though I have shown the preferred form of construction, I reserve to myself the right to make minor changes providing I do not violate the spirit and principle of my invention.

I claim:

1. In a doughnut baking machine, the combination of an oil containing kettle, an endless conveyer within the kettle, partition railings extending in spaced relation across the width of the conveyer, with a baffle plate at the tail end of the conveyer, said baffle plate inclining from the bottom at one side of the kettle toward the other side of the kettle and terminating near the surface of the oil, a plurality of openings near the upper edge of said baffle plate to promote a circulation of boiling oil from the under side of the baffle plate and across the width of the conveyer, whereby doughnuts delivered near said openings are caused to travel between the partition railings toward the other side of the kettle.

2. In a doughnut baking machine, the combination of a trough shaped kettle adapted to contain boiling oil, an endless conveyer moving longitudinally through the kettle, a baffle plate construction adapted to guide the upper run of the conveyer partly above the surface of the oil, a tunnel of grill work adjacent to the baffle plate construction adapted to submerge the upper run of the conveyer below the surface of the oil and thereby to submerge doughnuts on the conveyer below the surface of the boiling oil.

3. In a doughnut baking machine, the combination of an oil-containing kettle, an endless conveyer within the kettle, a baffle plate for distributing the doughnuts over the conveyer, a tunnel of grill work submerged in oil to guide the upper run of the conveyer, the floor of the tunnel continuing on an inclined plane above the surface of the oil, and means to make the movement of the conveyer intermittent.

4. In a doughnut baking machine, the combination of a supporting frame, a trough-shaped kettle adapted to heat oil, heating means attached to the frame below the kettle, a tunnel of grill work suspended from the edges of the kettle and proceeding for the greater length of the kettle below the surface of the oil, an endless conveyer traveling longitudinally through the kettle, said conveyer having partition railings extending in spaced relation across the width of the conveyer, a baffle plate construction near the tail end adapted to form a platform whereby said railings will project above the surface of the oil, from whence the conveyer with the railings enters the tunnel and submerges doughnuts, deposited between said railings, below the surface of the oil.

Signed by me at Portland, Oregon, this 6th day of April, 1920.

WILLIAM WALLACE.